US011914586B2

(12) United States Patent
Zhang et al.

(10) Patent No.: US 11,914,586 B2
(45) Date of Patent: Feb. 27, 2024

(54) AUTOMATED PARTITIONING OF A DISTRIBUTED DATABASE SYSTEM

(71) Applicant: International Business Machines Corporation, Armonk, NY (US)

(72) Inventors: Hong Mei Zhang, Beijing (CN); Sheng Yan Sun, BeiJing (CN); Meng Wan, Beijing (CN); Peng Hui Jiang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/709,802

(22) Filed: Mar. 31, 2022

(65) Prior Publication Data
US 2023/0315725 A1 Oct. 5, 2023

(51) Int. Cl.
*G06F 16/2453* (2019.01)
*G06F 11/34* (2006.01)
*G06F 16/22* (2019.01)
*G06F 16/25* (2019.01)

(52) U.S. Cl.
CPC ...... *G06F 16/2453* (2019.01); *G06F 11/3409* (2013.01); *G06F 16/2255* (2019.01); *G06F 16/2282* (2019.01); *G06F 16/256* (2019.01)

(58) Field of Classification Search
CPC ............. G06F 16/2453; G06F 16/2255; G06F 16/2282; G06F 16/256; G06F 11/3409
See application file for complete search history.

(56) References Cited

U.S. PATENT DOCUMENTS

| 10,067,969 | B2 | 9/2018 | Rice et al. | |
| 10,824,611 | B2 | 11/2020 | Lee et al. | |
| 10,963,464 | B2 | 3/2021 | Eadon et al. | |
| 2016/0350392 | A1* | 12/2016 | Rice | G06F 16/278 |
| 2018/0096045 | A1* | 4/2018 | Merriman | G06F 16/273 |
| 2019/0303486 | A1* | 10/2019 | Zhuge | G06F 16/278 |

(Continued)

OTHER PUBLICATIONS ip.com, Method to decide on the best partitioning cols. and best range values for creating the range partition tables, Oct. 29, 2010.

(Continued)

*Primary Examiner* — Dangelino N Gortayo
(74) *Attorney, Agent, or Firm* — Garg Law Firm, PLLC; Rakesh Garg; Nicholas Welling

(57) ABSTRACT

An embodiment includes generating a partition schema for a distributed database based on historical usage data indicative of usage of the distributed database, where the generating of the partition schema comprises determining a partition range of a partition of the partition schema. The embodiment also includes generating a node identifier for the partition using a hash function and a first weight value assigned to the partition. The embodiment also includes monitoring performance data indicative of a performance of the distributed database, the monitoring comprising detecting a failure of the performance to satisfy a performance threshold. The embodiment also includes initiating, responsive to detecting the failure, a redistribution procedure by changing the node identifier of the partition by replacing the first weight value with a second weight value.

20 Claims, 14 Drawing Sheets

(56) References Cited

U.S. PATENT DOCUMENTS

| | | | |
|---|---|---|---|
| 2019/0392047 A1* | 12/2019 | Sorenson, III | G06F 16/172 |
| 2021/0019316 A1* | 1/2021 | Pang | G06F 16/24535 |
| 2022/0121667 A1* | 4/2022 | Wong | G06F 16/24554 |
| 2022/0269684 A1* | 8/2022 | Brendle | G06F 16/24552 |

OTHER PUBLICATIONS

Fetai et al., Workload-driven adaptive data partitioning and distribution—The Cumulus approach, Oct. 29-Nov. 1, 2015, 2015 IEEE International Conference on Big Data (Big Data).

Oracle, Manage Automatic Partitioning on Autonomous Database, 2022, https://docs.oracle.com/en/cloud/paas/autonomous-database/adbsa/mdw-managing-automatic-partitioning-autonomous-database.html#GUID-03973BB7-BD09-4E5E-B47F-430D7CC949D6.

Chen et al., Hybrid Range Consistent Hash Partitioning Strategy—A New Data Partition Strategy for NoSQL Database, 2013 12th IEEE International Conference on Trust, Security and Privacy in Computing and Communications, Jul. 16-18, 2013.

\* cited by examiner

AUTOMATED PARTITIONING OF A DISTRIBUTED DATABASE SYSTEM

BACKGROUND

The present invention relates generally to a method, system, and computer program product for distributed database systems. More particularly, the present invention relates to a method, system, and computer program product for automated partitioning of a distributed database system.

Modern database systems provide rapid information storage, searching, and retrieval capabilities. However, the amount of digital content is growing at an exponential rate and requires substantial storage systems to store and manage the content. Thus, modern databases often interact with or are part of computer applications that collect, update, analyze, or report on large sets of data.

Where those data sets are so large, and the demand for access thereto is so high that performance or storage thresholds of a single server are reached, data can be distributed across one or more 'logical nodes' or 'partitions' in a distributed database system (DDBS). A DDBS typically includes multiple logical nodes that are stored on physical nodes, such as servers or other network storage devices. Each physical node may store one or more logical nodes. The logical nodes are logically integrated by a distributed database management system (DDBMS) so as to have the appearance of a single database to end users. The degree to which physical node locations (also referred to as "sites") are geographically distributed can vary significantly. For example, the physical nodes may be located on different racks of a datacenter, different floors of an office building, different facilities in a metropolitan area, or even on different continents.

The data in each of the logical nodes typically includes data that is interrelated, meaning that it may be necessary to access data from more than one logical node to answer some queries. The extent of the interrelatedness may vary depending on the type of data on the various logical nodes. For example, the interrelatedness of unstructured data in a NoSQL (Not only Structured Query Language) database system is generally somewhat loosely defined compared to the interrelatedness of structured data in a relational database system.

There are many different architectures that can be used to implement a DDBS. Some DDBS architectures are peer-to-peer (P2P) systems with varying degrees of distinction as to the data management functionality of different sites. There are also client/server architectures that have varying degrees of focus on assigning more demanding data operations to back-end servers, freeing the front-end clients to effectively run applications that are querying the database. Other variations in architectures may involve differences involving data delivery, such as the delivery modes, the frequency of data delivery, and the communication methods used for data delivery. Delivery modes include push delivery in which data transfers are initiated by the sender, pull delivery in which data transfer are initiated by the receiver, and hybrid modes that include a combination of push and pull delivery mechanisms. Common categories of delivery frequency include periodic delivery that involves data delivery at regular time intervals, conditional delivery that can be thought of as rule-based techniques for initiating data transfers, and ad hoc delivery that involves more irregular techniques, such as pulling data on an as-needed basis. Communication methods may include unicast techniques involving one-to-one communications between a data provider and a receiver, or one-to-many communications such as those involving multicast or broadcast protocols.

There are also many different data placement strategies that can be used when implementing a DDBS. Within the context of transitioning data from a single global database to a DDBS, developing a data placement strategy involves deciding how to store the data on the logical nodes of the DDBS. The data can be replicated on two or more logical nodes or divided into partitions that are then assigned to respective logical nodes. There are also hybrid data placement approaches in which the data is partitioned, and the partitions are replicated on two or more logical nodes. Once the data placement strategy has been determined, it will be described in metadata as part of a schema and may also include mapping definitions that will allow the DDBMS to locate data among the multiple logical nodes.

SUMMARY

The illustrative embodiments provide for automated partitioning of a distributed database system. An embodiment includes generating a partition schema for a distributed database based on historical usage data indicative of usage of the distributed database, where the generating of the partition schema comprises generating a partition range of a partition of the partition schema. The embodiment also includes generating a logical node identifier for the partition using a hash function and a first weight value assigned to the partition. The embodiment also includes monitoring performance data indicative of a performance of the distributed database, the monitoring comprising detecting a failure of the performance to satisfy a performance threshold. The embodiment also includes initiating, responsive to detecting the failure, a redistribution procedure by changing the logical node identifier of the partition by replacing the first weight value with a second weight value. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
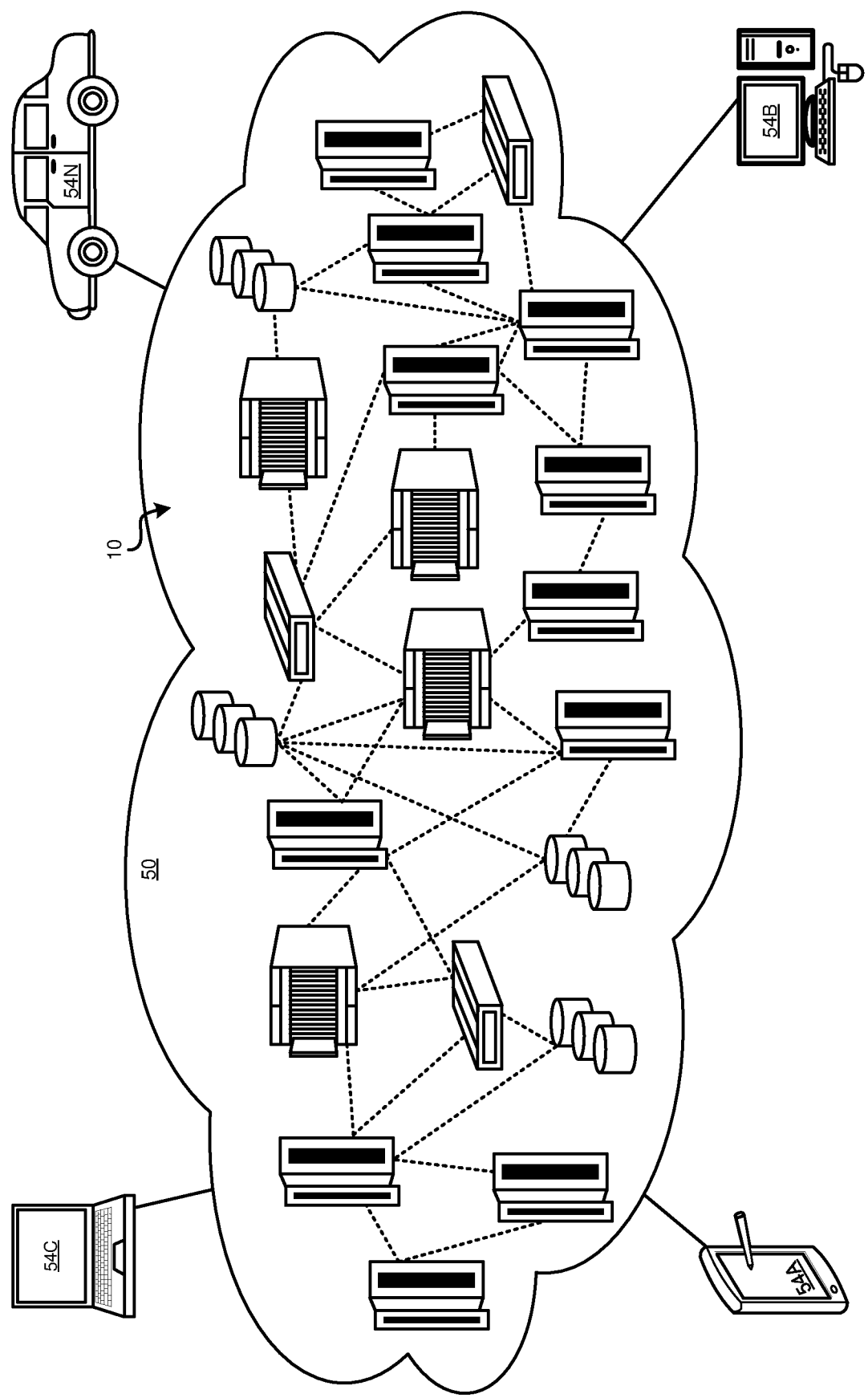
FIG. 1 depicts a cloud computing environment according to an embodiment of the present invention.

The illustrative embodiments recognize that there is a need to automate optimal database partitioning processes. There are numerous partitioning techniques that can be used to partition data. If done correctly, partitioning can significantly improve the performance of a database. On the other hand, if not done correctly, partitioning can have a negative impact on the performance of a database. For example, the performance of a column-partitioned database will usually improve for queries involving a small subset of the columns. On the other hand, the performance of the same column-partitioned database may decline for queries involving more than a small subset of the columns (i.e., columns at multiple logical nodes).

Thus, the column partitioning strategy in the above example may or may not improve the overall performance of the DDBS depending on the frequency of one type of queries compared to that of another. For a database that would incur a decline in performance with that strategy, a different partitioning strategy may be result in an improvement in performance that better aligns with the types of queries most commonly received. Also, while a particular partitioning strategy may initially result in a performance improvement, over time that may change. As data is added and removed from the database, data may become unevenly distributed among the logical nodes. When this happens, there is a risk that the database may become unstable with a few logical nodes doing a majority of the work while other logical nodes remain idle.

It is typically the responsibility of a database engineer or administrator to design and monitor a DDBS to achieve and maintain acceptable performance levels for the logical nodes and the DDBS as a whole. However, the emergence of cloud computing in recent years has made sophisticated computing environments, such as geographically-distributed database environments, more accessible to a broader user base. In some cases, users in cloud environments may lack the expertise to properly design and maintain a DDBS. As a result, users may experience poor DDBS performance, lack the expertise to properly address issues and improve performance, and for various reasons (e.g., data privacy, compliance issues, security concerns, etc.) may be reluctant to grant access to a third party to improve and maintain the database.

The illustrative embodiments recognize that the presently available DDBS tools or solutions do not address these needs or provide adequate solutions for these needs. The illustrative embodiments used to describe the invention generally address and solve the above-described problems and other problems related to automated partitioning of a distributed database system.

An embodiment can be implemented as a software application. The application implementing an embodiment can be configured as a modification of an existing DDBS, as a separate application that operates in conjunction with an existing DDBS, a standalone application, or some combination thereof.

Particularly, some illustrative embodiments provide a computer-based method that uses historical usage data that was collected over an extended period of time to generate a partition schema for a DDBS. The computer-based method then assigns a weight to each of the partitions, and uses a hash function to calculate a hash for each of the partitions based at least in part on the assigned weight. The computer-based method then uses the hash values to generate a schema map.

In some embodiment, a process for automated partitioning of a distributed database system retrieves historical usage data for a DDBS. The process determines a partition schema of the DDBS based on the historical usage data. In some embodiments, the process also determines partition ranges of one or more partitions of the partition schema. The process then generates a node identifier(s) for the one or more new partition(s) using a hash function and respective weight values assigned to the partition(s).

In some embodiments, the process monitors performance data indicative of a performance of the DDBS. If the process determines that the performance of the database fails to satisfy a performance threshold, the process initiates a redistribution procedure by changing the node identifier of the problematic partition. In some embodiments, the process changes the node identifier of the partition by replacing the first weight value with a second weight value. This change initiates a redistribution routine by the DDBMS.

The manner of automated partitioning of a distributed database system described herein is unavailable in the presently available methods in the technological field of endeavor pertaining to databases. A method of an embodiment described herein, when implemented to execute on a device or data processing system, comprises substantial advancement of the functionality of that device or data processing system in configuring a distributed database system and monitoring the distributed database system on an ongoing basis to automatically achieve and maintain desirable performance levels with little or no need for user intervention. As a result, the claimed automated partitioning process allows the DDBS to operate in a more optimal manner that requires less memory and fewer processing cycles than required for a less-optimally or improperly configured DDBS. This in turn improves the efficiency of computers, servers, or other hardware involved in hosting the DDBS.

The illustrative embodiments are described with respect to certain types of databases, DDBSs, logical nodes, physical nodes, data logs, data structures, partition types, and partition keys, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures, therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected physical nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
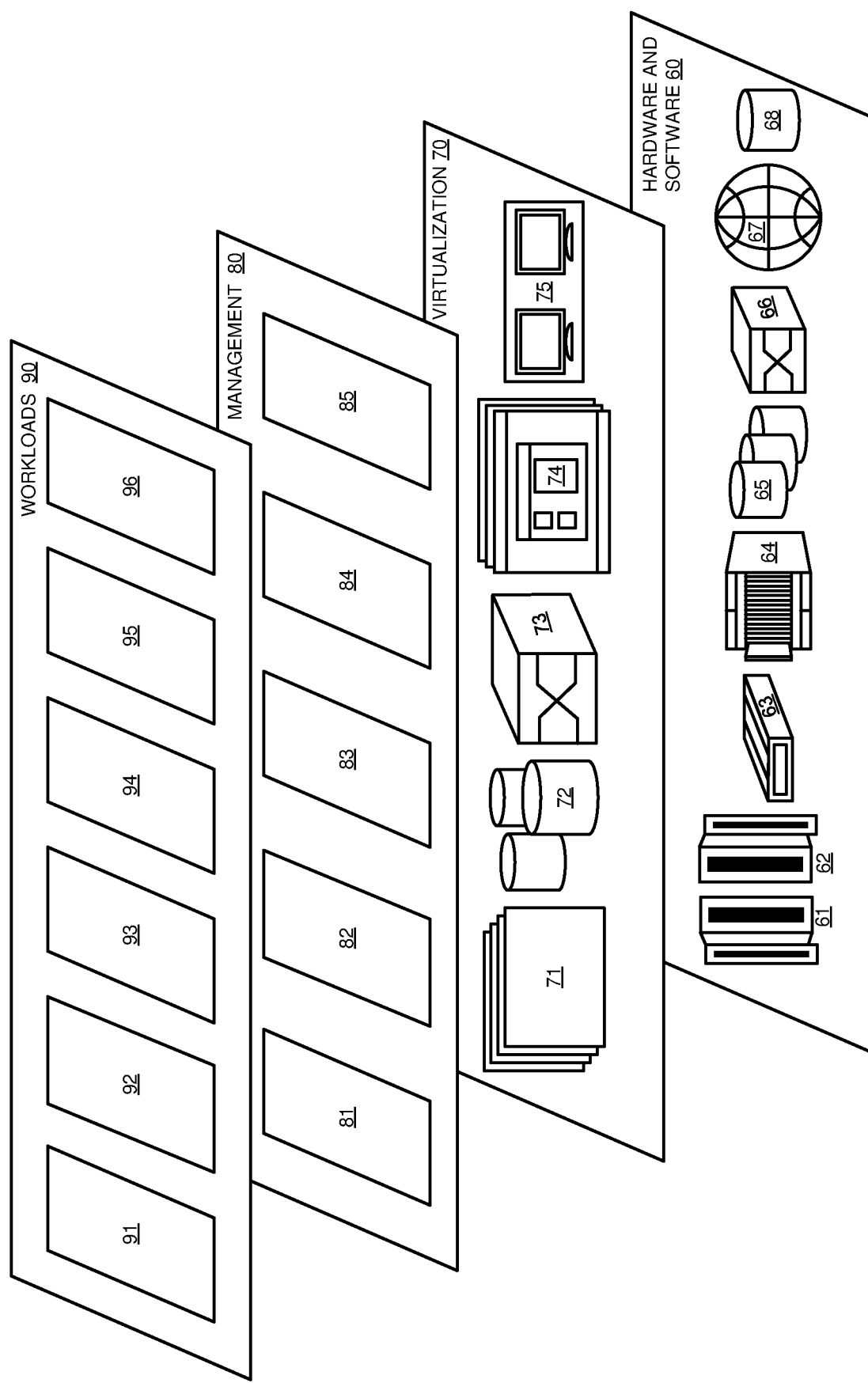
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68. In some embodiments, one or more of the mainframes 61, RISC architecture-based servers 62, servers 63, blade servers 64, storage devices 65, and networks and networking components 66 may be a 'physical node' of a DDBS according to any of the disclosed embodiments. Within each 'physical node,' there may be one or more 'logical nodes' or 'partitions.'

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for automated partitioning of a distributed database system as described herein. In some embodiments, the workloads and functions 96 for automated partitioning of a distributed database system also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
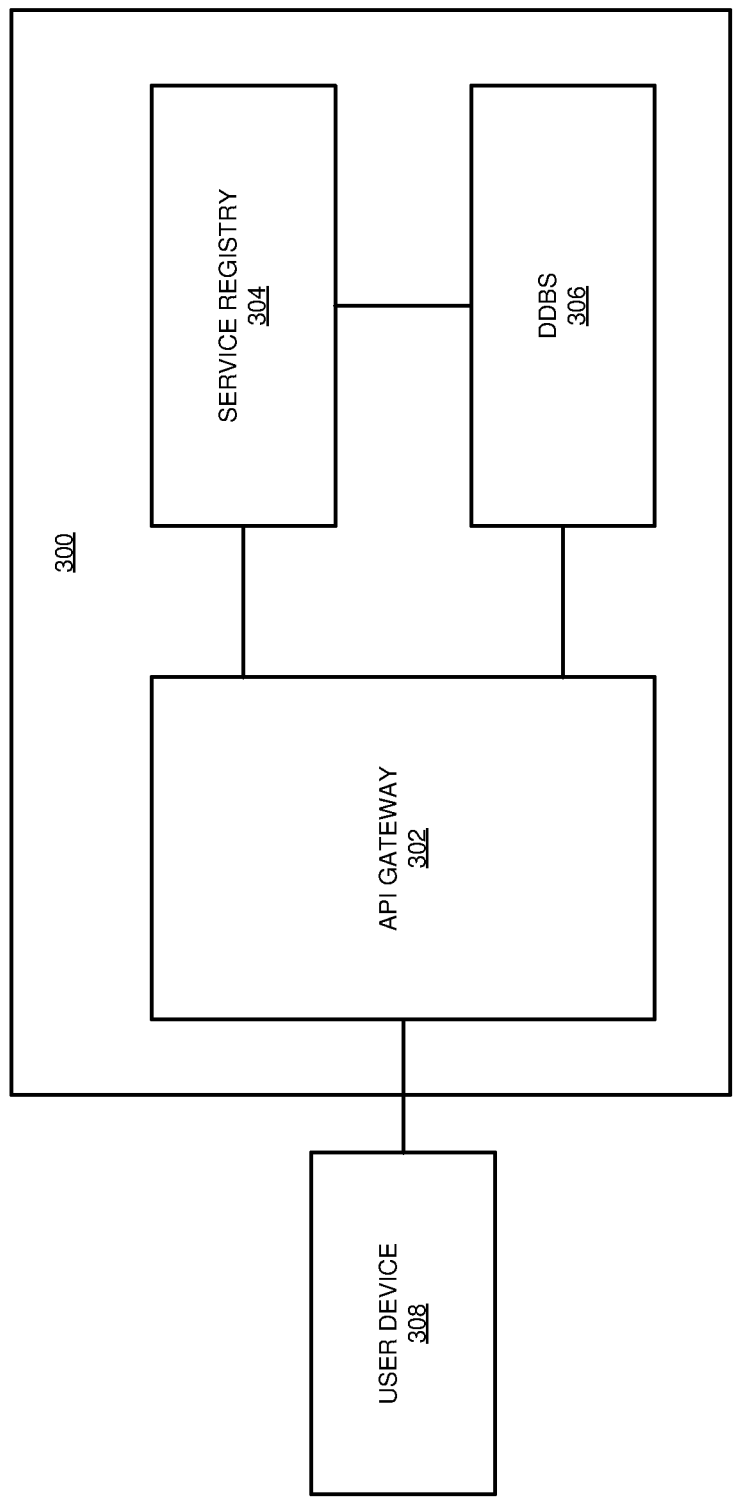
FIG. 3 depicts a block diagram of an example service infrastructure that includes a DDBS in accordance with an illustrative embodiment.

With reference to FIG. 3, this figure depicts a block diagram of an example service infrastructure 300 that includes a DDBS 306 in accordance with an illustrative embodiment. In some embodiments, the DDBS 306 is deployed in workloads layer 90 of FIG. 2. By way of example, in some embodiments, DDBS 306 is implemented as a cloud-based system for hosting and organizing bookmarks that may be shared by multiple users, for example across a department, organization, or enterprise.

In the illustrated embodiment, the service infrastructure 300 provides services and service instances to a user device 308. In some embodiments, the user device 308 is a personal digital assistant (PDA) or cellular telephone 54A, desktop computer 54B, laptop computer 54C, and/or automobile computer system 54N of FIG. 1. User device 308 communicates with service infrastructure 300 via an application programming interface (API) gateway 302. In various embodiments, service infrastructure 300 and its associated DDBS 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and use any suitable communication protocols such as Wi-Fi, Bluetooth, etc. Service infrastructure 300 may be built on the basis of cloud computing. API gateway 302 provides access to cloud applications like DDBS 306. API gateway 302 receives service requests issued by cloud applications, and creates service lookup requests based on service requests. As a non-limiting example, in an embodiment, the user device 308 includes software, such as a web browser or database client software application, that is configured to communicate with the DDBS 306.

In the illustrated embodiment, service infrastructure 300 includes a service registry 304. In some embodiments, service registry 304 looks up service instances of DDBS 306 in response to a service lookup request such as one from API gateway 302 in response to a service request from user device 308. For example, in some embodiments, the service registry 304 looks up service instances of DDBS 306 in response to requests from the user device 308 related to database queries.

In some embodiments, the service infrastructure 300 includes one or more instances of the DDBS 306. In some such embodiments, each of the multiple instances of the DDBS 306 run independently on multiple computing systems. In some such embodiments, DDBS 306, as well as other service instances of DDBS 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics, and selects top-ranking service instances for classification requests. In some such embodiments, in the event that a service instance becomes unresponsive or, unhealthy, the service registry will no longer provide its address or information about this service instance to other services.

Figure 4:
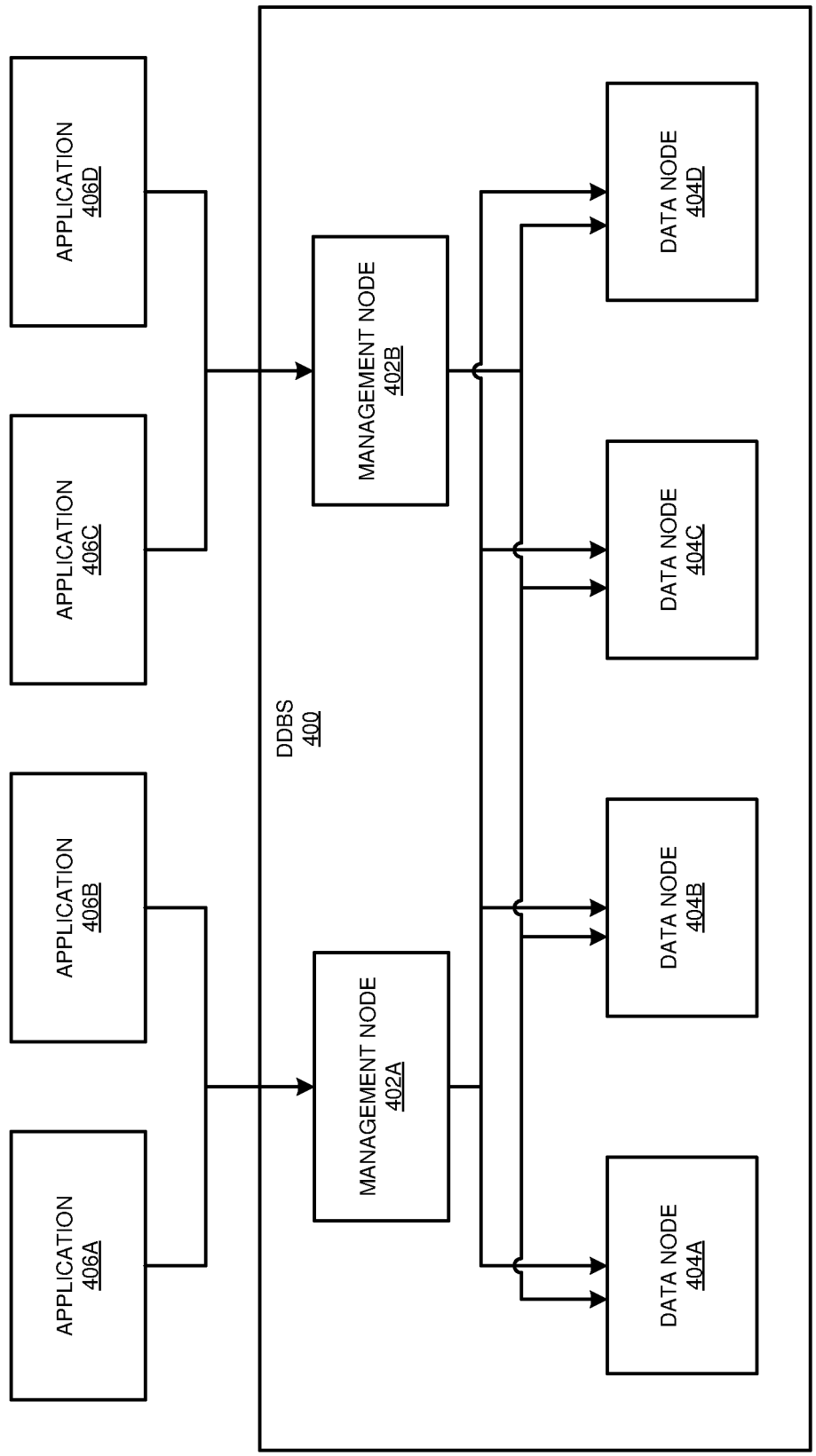
FIG. 4 depicts a block diagram of an example of a distribution of data in a DDBS in accordance with an illustrative embodiment.

With reference to FIG. 4, this figure depicts a block diagram of an example of a distribution of data in a DDBS 400 in accordance with an illustrative embodiment. In a particular embodiment, the DDBS 400 is an example of the DDBS 306 of FIG. 3 or the workloads and functions 96 for automated database processing of FIG. 1.

In some embodiments, the DDBS 400 may be deployed on one server or a server cluster including a plurality of servers. The DDBS 400 includes management nodes 402A and 402B. In some embodiments, the management nodes 402A and 402B include respective DDBMSs or share a single DDBMS. The management nodes 402A and 402B allow applications 406A-406D to query the data distributed among data nodes 404A-404D. In some embodiments, the data nodes 404A-404D are logical nodes. In some embodiments, the distributed nature of the data on the data nodes 404A-404D is transparent to the applications 406A-406D, to which the data appears to be stored as a single global database.

In some embodiments, the management nodes 402A and 402B are each configured to manage data nodes 404A-404D. In some embodiments, the management nodes 402A and 402B implement operations performed by applications 406A-406D on appropriate data nodes 404A-404D, for example data addition operations, data deletion operations, data modification operations, and/or data query operations.

In some embodiments, the management nodes 402A and 402B are independent nodes, or a specified data node, or an elected data node in the plurality of data nodes. In some embodiments, the management nodes 402A and 402B are deployed on a server or a server cluster including a plurality of servers. Each data node represents a specified minimum processing unit of the DDBS 400. For example, in some embodiments, each of the data nodes 404A-404D is an application instance or a database execution process that manages and/or stores data.

Figure 5:
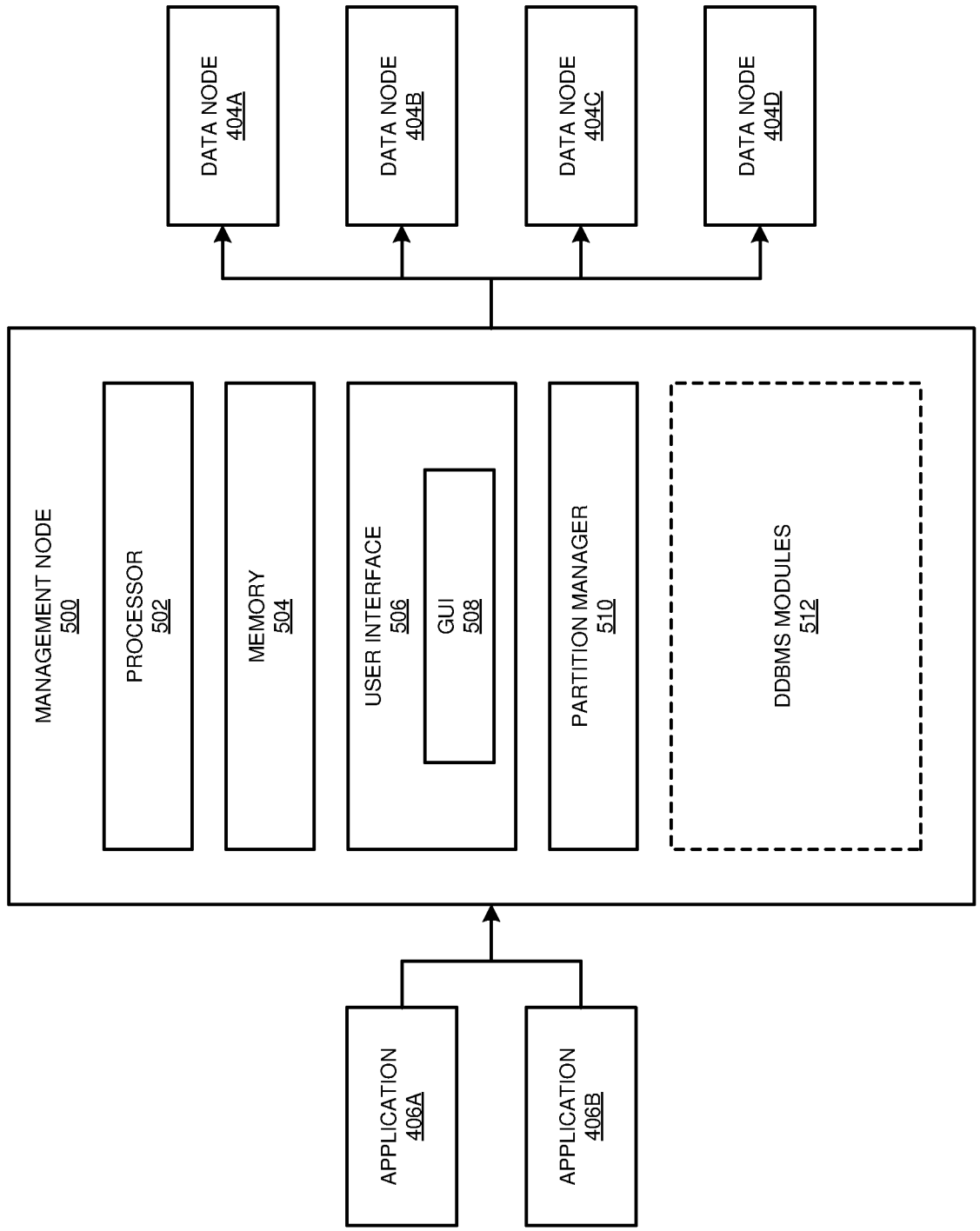
FIG. 5 depicts a block diagram of an example management node in accordance with an illustrative embodiment.

With reference to FIG. 5, this figure depicts a block diagram of an example management node 500 in accordance with an illustrative embodiment. In a particular embodiment, the management node 500 is an example of the management nodes 402A-402B of FIG. 4

In the illustrated embodiment, the management node 500 includes a processor 502, memory 504, user interface 506 including a graphical user interface (GUI) 508, a partition manager 510, as well as other DDBMS modules 512 that are known in the art. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the processor 502 performs various computational and data processing tasks, as well as other functionality. The processor 502 is in communication with memory 504. In some embodiments, the memory 504 comprises one or more computer readable storage media with program instructions collectively stored on the one or more computer readable storage media, with the program instructions being executable by one or more processors 502 to cause the one or more processors 502 to perform operations described herein.

In the illustrated embodiment, the user interface 506 provides a point of human interaction with the management node 500. For example, in the illustrated embodiment, the user interface 506 communicates with applications 406A and 406B running on one or more user devices, which may be any type of user computing device, for example the personal digital assistant (PDA) or cellular telephone 54A, desktop computer 54B, laptop computer 54C, and/or automobile computer system 54N shown in FIG. 1, and may include such things as a display, touch screen, keyboard, processor, memory, network interface, and other known components of such computing devices. In some embodiments, the user interface 506 communicates with the applications 406A and 406B via a network, such as the Internet and/or a private or corporate intranet. In the illustrated embodiment, the GUI 508 renders various views for the application(s) 406A/406B to interpret and display to a user, and receives data from the application(s) 406A/406B indicative of various user inputs, commands, queries, etc.

In some embodiments, the partition manager 510 performs various task associated with automated distribution of data among one or more logical nodes, such as data nodes 404A-404D in the illustrated embodiment. For example, in some embodiments, the partition manager 510 is configured to use historical usage data that was collected over an extended period of time to generate a partition schema for a DDBS. The partition manager 510 then assigns a weight to each of the partitions, and uses a hash function to calculate a hash for each of the partitions based at least in part on the assigned weight.

Figure 6:
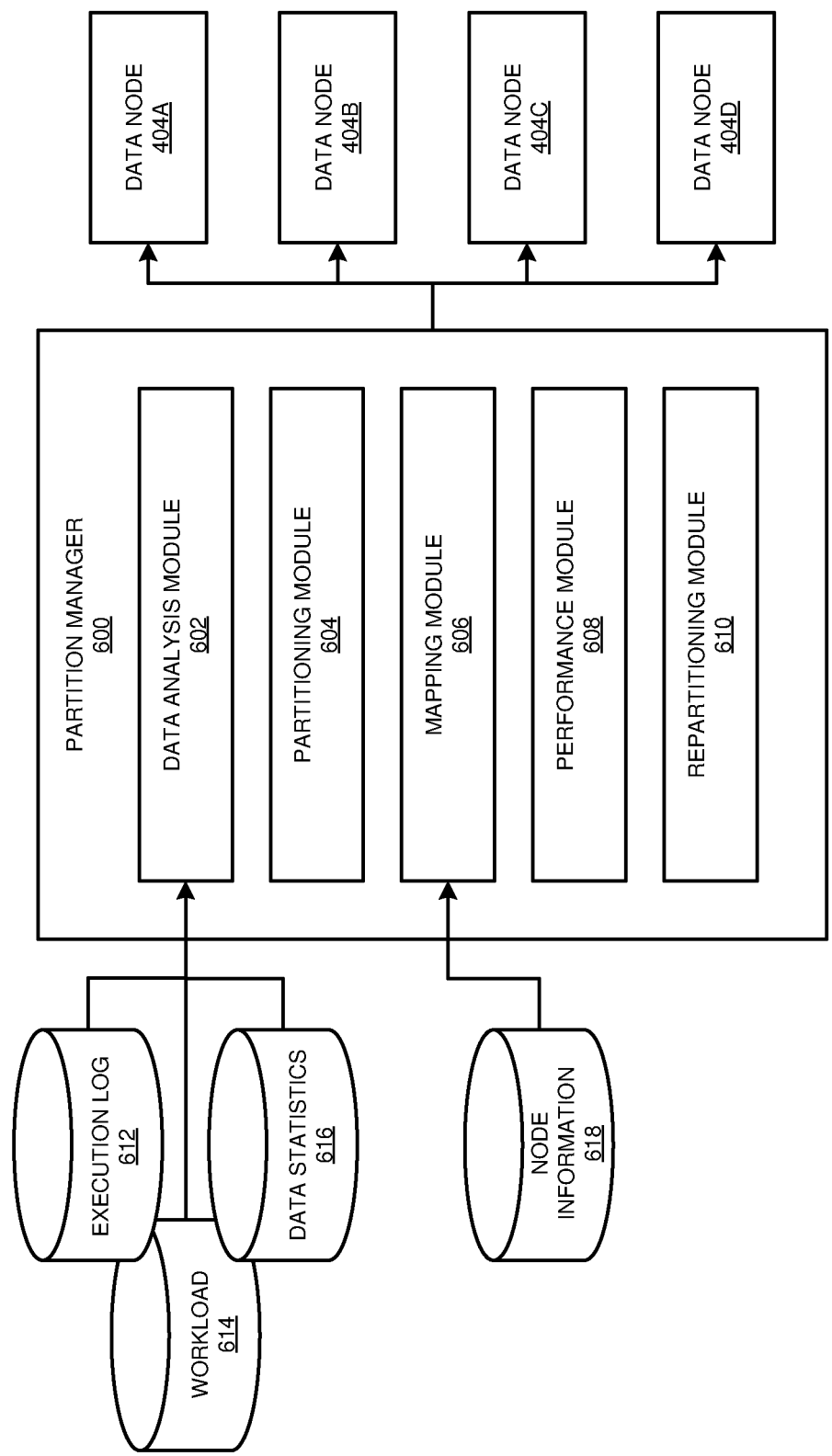
FIG. 6 depicts a block diagram of an example partition manager in accordance with an illustrative embodiment.

With reference to FIG. 6, this figure depicts a block diagram of an example partition manager 600 in accordance with an illustrative embodiment. In a particular embodiment, the partition manager 600 is an example of the partition manager 510 of FIG. 5.

In the illustrated embodiment, the partition manager 600 includes a data analysis module 602, a partitioning module 604, a mapping module 606, a performance module 608, and a repartitioning module 610. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the data analysis module 602 receives and parses historical usage data. In some embodiments, the data analysis module 602 parses the historical usage data to extract data indicative of usage of the distributed database over some significant period of time. The criteria for what constitutes a significant period of time will typically be highly implementation-specific, and long enough to collect at least a representative sampling of typical database activity. The historical usage data includes data from an execution log 612, workload data 614, and data statistics 616. In some embodiments, the data analysis module 602 parses data from execution log 612 by extracting data indicating different queries that have been made to the database and the frequency of each of the different queries. In some embodiments, the data analysis module 602 parses data from the workload data 614 by extracting data indicating the types of queries and applications that access the database. In some embodiments, the data analysis module 602 parses data from the data statistics 616 by extracting data that provides information about the data in the database, such as the number of records or data items in a table or some specified range.

In the illustrated embodiment, the partitioning module 604 generates a partition schema for a distributed database based on the historical usage data collected by the data analysis module 602. Analysis of the historical usage data reveals information about how the data is most often accessed and the workload priority associated with different access methods. For example, the historical usage data includes data indicative of typical query predicate ranges of rows or features (columns) that are often used for constraint exclusion, etc. The partitioning module 604 then uses this information to divide the data into preliminary partition ranges based on how the data is accessed. For example, in some embodiments, the partitioning module 604 distinguishes between data according to access modes, for example by distinguishing between that is randomly accessed (i.e., random access mode) and other data that is frequently scanned by a row range predicate on a good partitioning column (i.e., range access mode). A good partitioning column will have one or more desirable qualities, such as having a static value that is not likely to change, having a wide range of possible values, appearing frequently in queries as a filter, and/or other qualities that may be implementation specific. In some embodiments, if a dataset or block of data is frequently accessed by more than one access method, the access method associated with a higher workload priority and/or higher frequency will be used as the basis for partitioning in order to optimize the partitioning to high priority and/or high frequency workloads.

In a non-limiting example embodiment, data includes a first set of data blocks that are frequently scanned by a row range predicate on ORDER_DATE, a first set of data blocks that are frequently scanned by a row range predicate on PURCHASE_DATE, and data blocks that are randomly scanned. In this example, the partitioning module 604 would group the randomly accessed data for hash partitioning, would group a first portion of the other data for range partitioning on ORDER_DATE, and would group a second portion of the other groups for range partitioning on PURCHASE_DATE. Thus, in this example, the result is three new partitions.

In the illustrated embodiment, the mapping module 606 maps ranges of data to logical nodes (e.g., based on node information 618) using a Straw hash technique. The Straw hash technique includes calculating a hash value that a DDBS (e.g., DDBS 306 of FIG. 3 or DDBS 400 of FIG. 4) can later determine—by performing the same or similar calculation—to locate a hash value of a logical node for a particular range. Using the Straw hash technique, the mapping module 606 calculates a hash value for each logical node using a respective logical partition key (Range_Key), copy number for a multiple copy system (Copy_id)(e.g., beginning with 0 as the primary copy node), and node number (Node_id) as indicated by Expression (1) below.

$$\text{Hash\_node}=\text{Hash}(\text{Range\_key},\text{Copy\_id},\text{Node\_id}) \quad (1)$$

Next, weights are calculated and assigned to each of the logical nodes. There are many ways the weight values can be calculated. In some embodiments, the weight values are a function of one or more of the query frequency (e.g., number of queries per week or per day) and/or average query processing time of key queries used to derive key ranges for the partitions. In some such embodiments, larger weights are assigned to queries that occur more frequently and/or require more processing time. The weight is then added to the hash value for each node to get the final target node identifier (Node_id) for the associated data range as indicated by Expression (2) below.

$$\text{Node\_id}=\text{MAX}(f(\text{node\_weight})*\text{Hash}(\text{Range\_key},\text{Copy\_id},\text{Node\_id})) \quad (2)$$

In the illustrated embodiment, the performance module 608 monitors performance data indicative of a performance of the distributed database. In some embodiments, the performance module 608 monitors the performance of the DDBS to identify performance issues that indicate the need to repartition the database, such as an overloaded or underperforming node. For example, in some embodiments, the performance module 608 monitors the performance of the data nodes 404A-404D in terms of query and transaction response times to identify indicators of system capacity or performance problems. If the performance module 608 identifies a problem, it provides the repartitioning module 610 with data indicative of the type of problem, node or nodes involved, and may include instructions for resolving the issue, such as node replacement, repartitioning, etc.

In the illustrated embodiment, the repartitioning module 610 performs various database maintenance tasks, such as adding a node, removing a node, or replacing a node, and repartitioning the data to be redistributed among the resulting nodes. In some embodiments, the repartitioning module 610 is able to initiate a redistribution procedure performed by other DDBMS modules 512, which may be triggered by the removal or addition of a node. In some such embodiments, the repartitioning module 610 triggers such a procedure by changing the weight of a problem node. Since the node identifier (Node_id) is dependent on the weight value, this changes the node identifier of the problem node, which has the effect of simulating a node removal and replacement, thereby triggering redistribution and balancing of the data among the nodes.

FIGS. 7A-7D depict block diagrams illustrating the functioning of a partition manager in accordance with an illustrative embodiment.

Figure 7A:
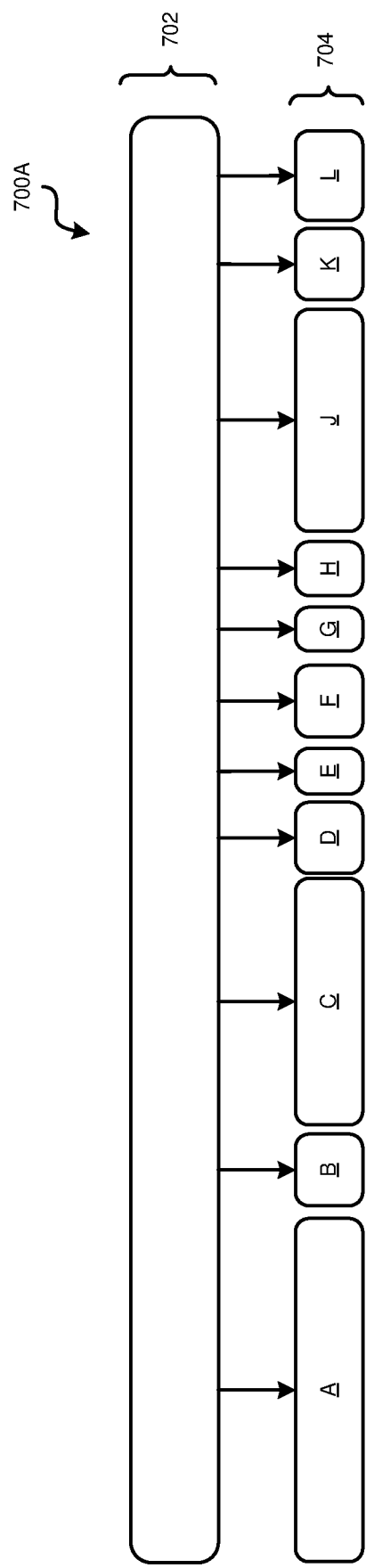
FIG. 7A depicts a block diagram of a first intermediate data structure in accordance with an illustrative embodiment.

With reference to FIG. 7A, this figure depicts a block diagram of a first intermediate data structure 700A in accordance with an illustrative embodiment. In a particular embodiment, the first intermediate data structure 700A is generated by the partition manager 600 of FIG. 6.

In the illustrated embodiment, the partition manager 600 receives historical usage data, which includes data indicative of usage of a block of data 702 over some significant period of time. The criteria for what constitutes a significant period of time will typically be highly implementation-specific, and long enough to collect at least a representative sampling of typical database activity. In some embodiments, the historical usage data includes data from an execution log 612, workload data 614, and data statistics 616 of FIG. 6. As a non-limiting example, the partition manager 600 may receive execution log data such as the sample data shown in Table 1 below and workloads data such as the sample data shown in Table 2 below. The partition manager 600 assembles the data from Tables 1 and 2, combined with received data statistics including range sizes, into Table 3 along with calculated weights for each range.

TABLE 1

| Query No. | Query | Frequency (times/week) | Ave. Time (mins.) | No. Rows |
|---|---|---|---|---|
| 1 | Select * from TB1 where A < C1 < E and c < C2 < d | 800 | 2 | 3000 |
| 2 | Select * from TB1 where B < C1 < C and (a < C2 < b or e < C2 < f) | 200 | 0.5 | 1400 |
| 3 | Select * from TB1 where C < C1 < F and 50 < C3 < 100 | 400 | 1.5 | 6000 |
| 4 | Select * from TB1 where C1 > G and x < C4< | 600 | 0.3 | 500 |

TABLE 2

| Range No. | Range Values |
|---|---|
| 1 | A <= C1 <= B& c < C2 < d |
| 2 | B < C1 <= C& c < C2 < d |
| 3 | B < C1 <= C& a < C2 < b |
| 4 | B < C1 <= C& e < C2 < f |
| 5 | C < C1 < E& c < C2 < d |
| 6 | C < C1 < E& 50 < C3 < 100 |

TABLE 2-continued

| Range No. | Range Values |
|---|---|
| 7 | E < C1 < F& 50 < C3 < 100 |
| 8 | C1 > G& x < C4 < y |

TABLE 3

| No. | Range | Weight | Range Size | Flag |
|---|---|---|---|---|
| 1 | A <= C1 <= B& c < C2 < d | 0.4 | 1000 | 1 |
| 2 | B < C1 <= C& c < C2 < d | 0.4 | 2000 | 1 |
| 3 | B < C1 <= C& a < C2 < b | 0.2 | 600 | 2 |
| 4 | B < C1 <= C& e < C2 < f | 0.2 | 800 | 2 |
| ... | | | | |

Using the sample data shown in Tables 1-3, the data 702 represents a range for a particular range key (or range keys) in column 1 (C1). In the illustrated embodiment, the partition manager 600 generates first intermediate data structure 700A as an intermediate step of generating a partition schema for a distributed database based on the historical usage data. Analysis of the historical usage data reveals information about ranges of C1 that are typically accessed together. The partition manager 600 groups the data 702 into preliminary partition ranges 704A-704L based on the typical ranges of C1 determined from the historical usage data.

Figure 7B:
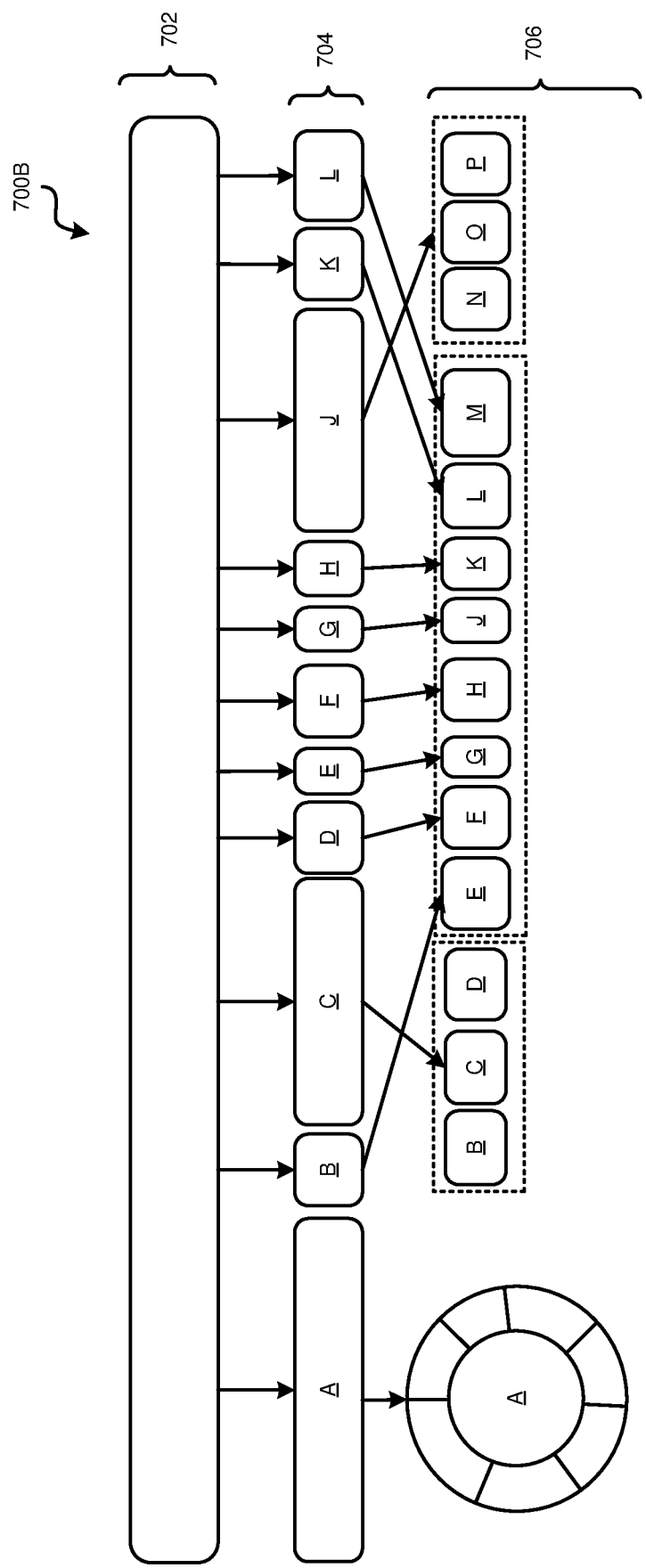
FIG. 7B depicts a block diagram of a second intermediate data structure in accordance with an illustrative embodiment.

With reference to FIG. 7B, this figure depicts a block diagram of a second intermediate data structure 700B in accordance with an illustrative embodiment. In a particular embodiment, the second intermediate data structure 700B is generated by the partition manager 600 of FIG. 6.

In the illustrated embodiment, the partition manager 600 generates second intermediate data structure 700B as another intermediate step of generating a partition schema for a distributed database based on the historical usage data. Analysis of the historical usage data reveals information about how the data in each of the preliminary partition ranges 704A-704L is most often accessed and the workload priority associated with different access methods. For example, the historical usage data includes data indicative of typical query predicate ranges of rows or features (columns) that are often used for constraint exclusion, etc. Using the example data shown in Table 2 above, it can be seen that Range numbers 1-5 in this example are also accessed using column 2 (C2), whereas the remaining Range numbers 6-8 are not accessed using C2. In this example, the partition manager 600 uses this distinction to group certain partition ranges. The arrows from preliminary partition ranges 704A-704L to secondary partition ranges 706A-706P show how the partition manager 600 has processed the preliminary partition ranges 704A-704L into re-designated secondary partition ranges 706A-706P. The preliminary partition ranges 704A-704B, 704D-704H, and 704K-704L each maintain the same respective range of rows upon being redesignated as secondary partition ranges 706A and 706E-706M, respectively, while preliminary partition range 704C is further divided into secondary partition ranges 706B-706D and preliminary partition range 704J is further divided into secondary partition ranges 706N-706P. Also, as indicated by the broken lines enclosing groups of the secondary partition ranges 706B-706D, 706E-706M, and 706N-706P, the broken lines enclose three preliminary partition groups that the partition manager 600 has identified in this example based on whether the ranges are accessed using C2 in addition to C1. Also, the partition manager 600 has determined partition types for the secondary partition ranges 706B-706P based on how the data in the respective ranges is accessed. In this example, secondary partition range 706A is a range of data that the partition manager 600 identified as being primarily randomly accessed, and the remaining secondary partition ranges 706B-706P are ranges of data that the partition manager 600 identified as data that is frequently access by a row range predicate. Therefore, in this example, the partition manager 600 has designated the secondary partition range 706A for hash partitioning, and the remaining secondary partition ranges 706B-706P for range partitioning on logical partition keys.

Figure 7C:
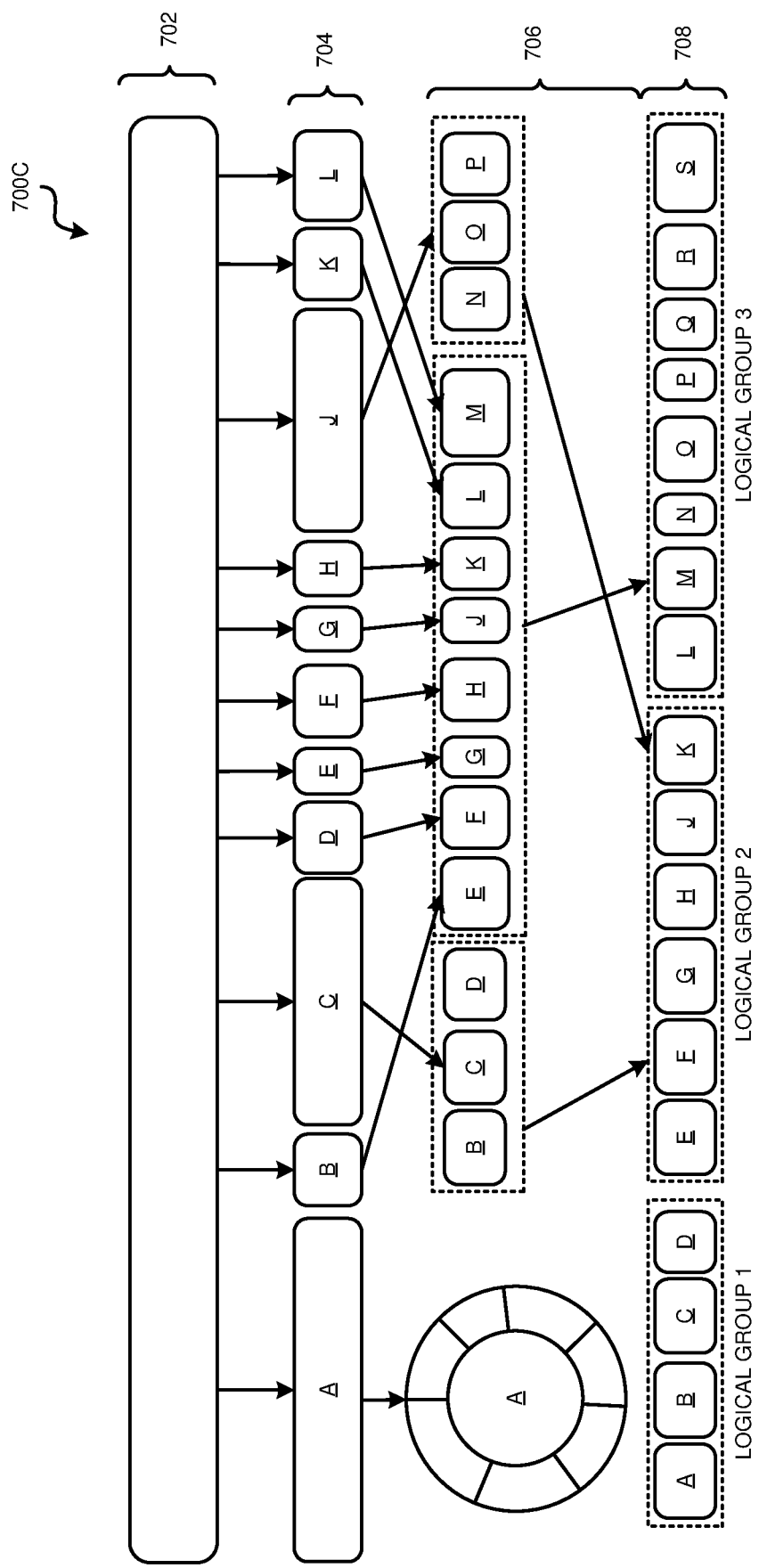
FIG. 7C depicts a block diagram of a third intermediate data structure in accordance with an illustrative embodiment.

With reference to FIG. 7C, this figure depicts a block diagram of a third intermediate data structure 700C in accordance with an illustrative embodiment. In a particular embodiment, the third intermediate data structure 700C is generated by the partition manager 600 of FIG. 6.

In the illustrated embodiment, the partition manager 600 generates the third intermediate data structure 700C as another intermediate step of generating a partition schema for a distributed database based on the historical usage data. Analysis of the historical usage data reveals information about how the data in each of the secondary partition ranges 706B-706P is most often accessed and the workload priority associated with different access methods. For example, the historical usage data includes data indicative of typical query predicate ranges of rows or features (columns) that are often used for constraint exclusion, etc. The partition manager 600 then uses this information to rearrange and possibly merge the groups of the secondary partition ranges 706A-706P as shown according to similarities in how the data is most often accessed and the workload priority associated with different access methods. For example, the historical usage data includes data indicative of typical query predicate ranges of rows or features (columns) that are often used for constraint exclusion, etc. This results in Logical Groups 1-3 as shown in FIG. 7C, which become the new partitions. In this example, secondary partition range 706A is merged with other randomly accessed ranges into Logical Group 1 of partition ranges 708A-708D, secondary partition ranges 706B-706D and 706N-706P are merged together into Logical Group 2 of partition ranges 708E-708K, and secondary partition ranges 706E-706M form Logical Group 3 of partition ranges 708L-708S.

Figure 7D:
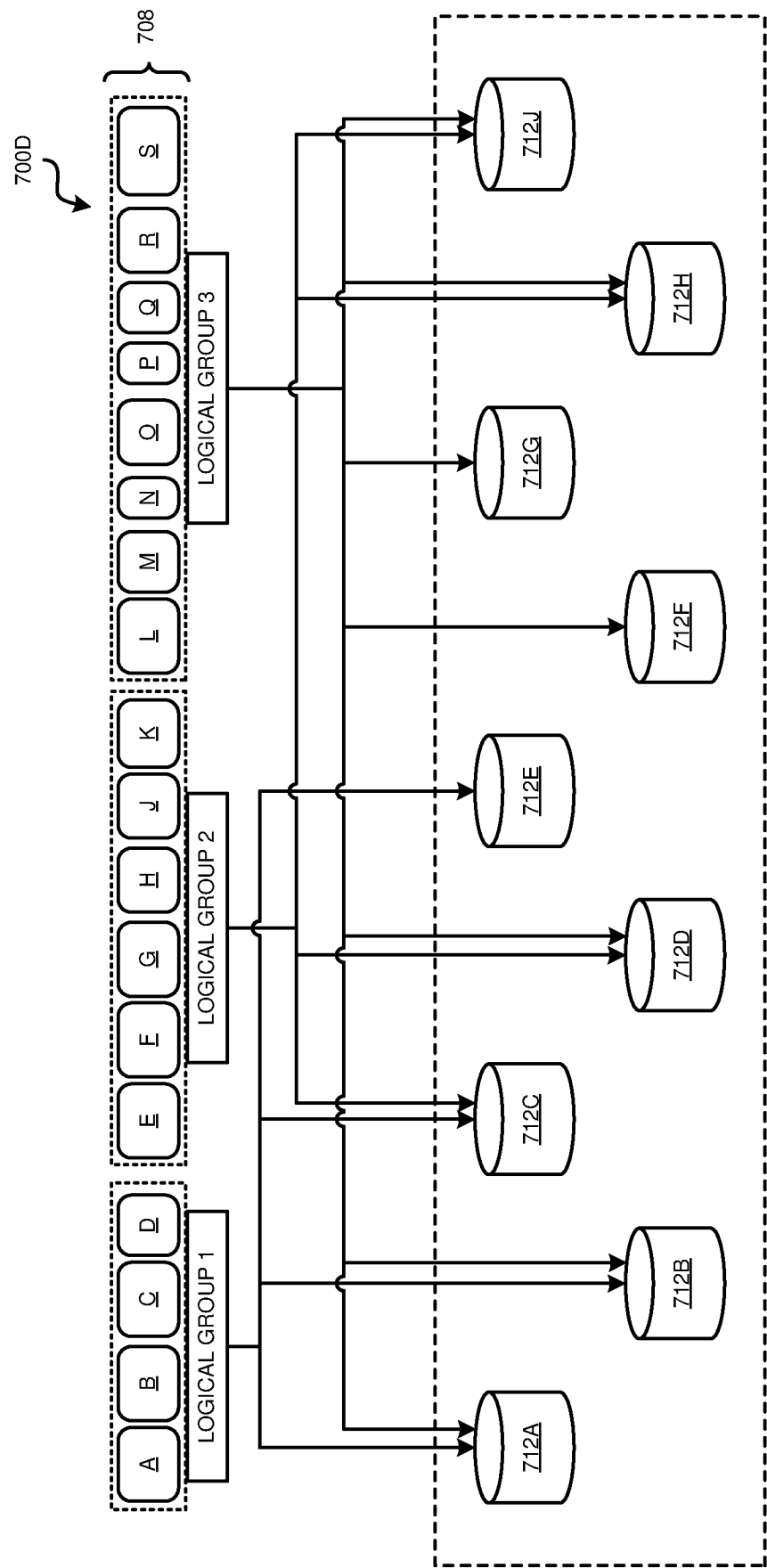
FIG. 7D depicts a block diagram of a final data structure in accordance with an illustrative embodiment.

With reference to FIG. 7D, this figure depicts a block diagram of a final data structure 700D in accordance with an illustrative embodiment. In a particular embodiment, the final data structure 700D is generated by the partition manager 600 of FIG. 6.

In the illustrated embodiment, the partition manager 600 assigns the new partitions designated Logical Groups 1-3 to logical nodes 712A-712J. The partitions constitute logical nodes that do not require a 1:1 relationship with physical nodes, so as shown the logical nodes may be spread among one or more physical nodes. In some embodiments, the ranges in the logical nodes may also be replicated on two or more logical and/or physical nodes for redundancy and/or performance reasons.

Figure 8:
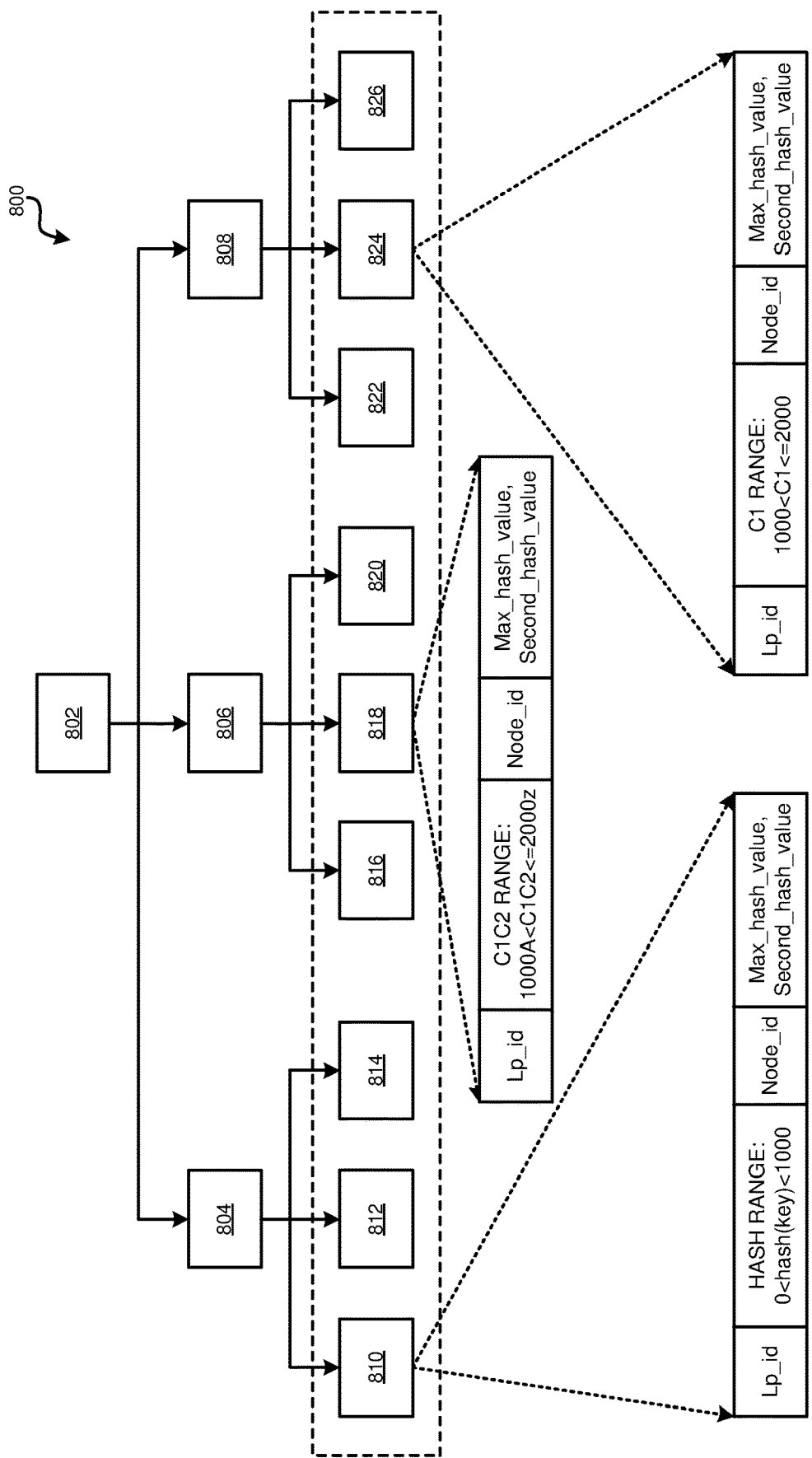
FIG. 8 depicts a block diagram of a final data structure in accordance with an illustrative embodiment.

With reference to FIG. 8, this figure depicts a block diagram of a partition tree data structure 800 in accordance with an illustrative embodiment. In a particular embodiment, the partition tree data structure 800 is an example of a partition tree that can be stored in, and used by, a DDBS (e.g., DDBS 306 of FIG. 3 or DDBS 400 of FIG. 4) to locate a logical node when performing a query. For example, when a DDBS is looking for a particular range or ranges of data in data structure, such as data structure 700D of FIG. 7D, the partition tree data structure 800 provides a way to locate the logical partition for that data. In some embodiments, the partition tree data structure 800 is a data structure generated by mapping module 606 of FIG. 6.

In the illustrated embodiment, a root node 802 is associated with a particular range. Continuing with the example data used in the description of FIGS. 7A-7D, the root node may be associated with a particular range key from column 1 (C1). The range in leaf node 802 has been divided into three different leaf nodes corresponding to respective different ranges that are stored in respective leaf nodes 804, 806, and 808. In some embodiments, the leaf nodes 804, 806, and 808 correspond with, and include data indicative of, Logical Groups 1-3, respectively, of FIG. 7D. The leaf nodes 804, 806, and 808 are each further divided into three sub-ranges in leaf nodes 810-826. Thus, leaf node 804 is divided into three ranges as respective logical partitions for which the hash data is stored in respective leaf nodes 810, 812, and 814; leaf node 806 is divided into three ranges as respective logical partitions for which the hash data is stored in respective leaf nodes 816, 818, and 820; leaf node 808 is divided into three ranges as respective logical partitions for which the hash data is stored in respective leaf nodes 822, 824, and 826.

In the illustrated embodiment, the partition manager 600 uses a Straw hash technique to generate Node identifiers for each group of replicated partitions. The Straw hash technique includes calculating a hash value for each logical node using a respective logical partition key (Range_Key), copy number for a multiple copy system (Copy_id)(e.g., beginning with 0 as the primary copy node), and node number (Node_id) as indicated by Expression (1) below.

$$\text{Hash\_node} = \text{Hash}(\text{Range\_key}, \text{Copy\_id}, \text{Node\_id}) \quad (1)$$

Next, weights are calculated and assigned to each of the logical nodes. There are many ways the weight values can be calculated. In some embodiments, the weight values are a function of one or more of the query frequency (e.g., number of queries per week or per day) and/or average query processing time of key queries used to derive key ranges for the partitions. In some such embodiments, larger weights are assigned to queries that occur more frequently and/or require more processing time. The weight is then added to the hash value for each node to get the final target node identifier (Node_id) for the associated data range as indicated by Expression (2) below.

$$\text{Node\_id} = \text{MAX}(f(\text{node\_weight}) * \text{Hash}(\text{Range\_key}, \text{Copy\_id}, \text{Node\_id})) \quad (2)$$

The resulting values are then stored in respective leaf nodes as shown in FIG. 8. In some embodiments, each logical partition may be replicated so that a backup copy is available if the primary node is unavailable. In some such embodiments, a second hash value is also calculated for the location of the backup logical node. In FIG. 8, the hash value for the primary node is stored in the corresponding leaf node as Max_hash_value and the hash value for the backup logical node is stored as Second_hash_value.

Figure 9:
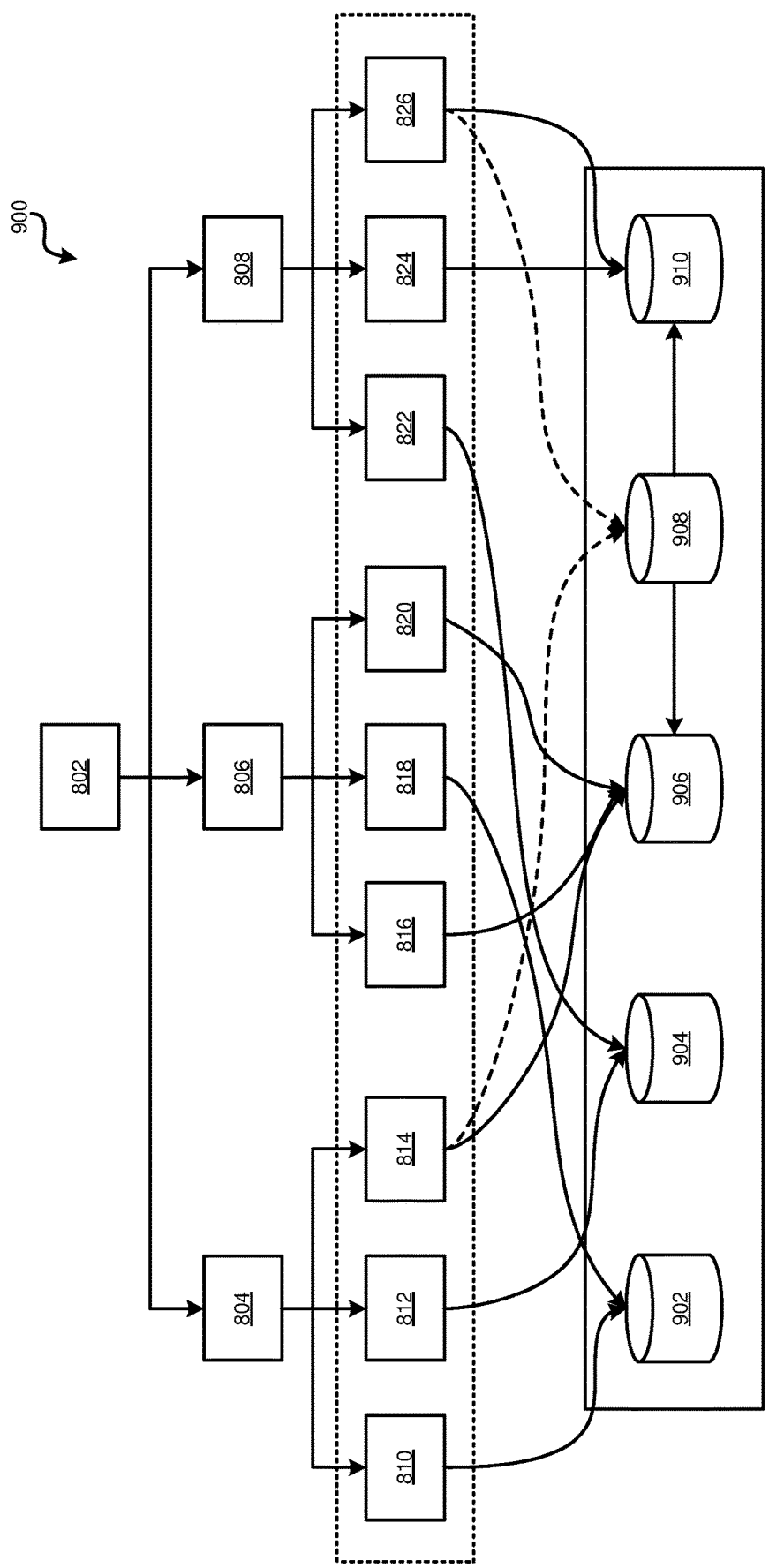
FIG. 9 depicts a block diagram of a final data structure in accordance with an illustrative embodiment.
Figure 10:
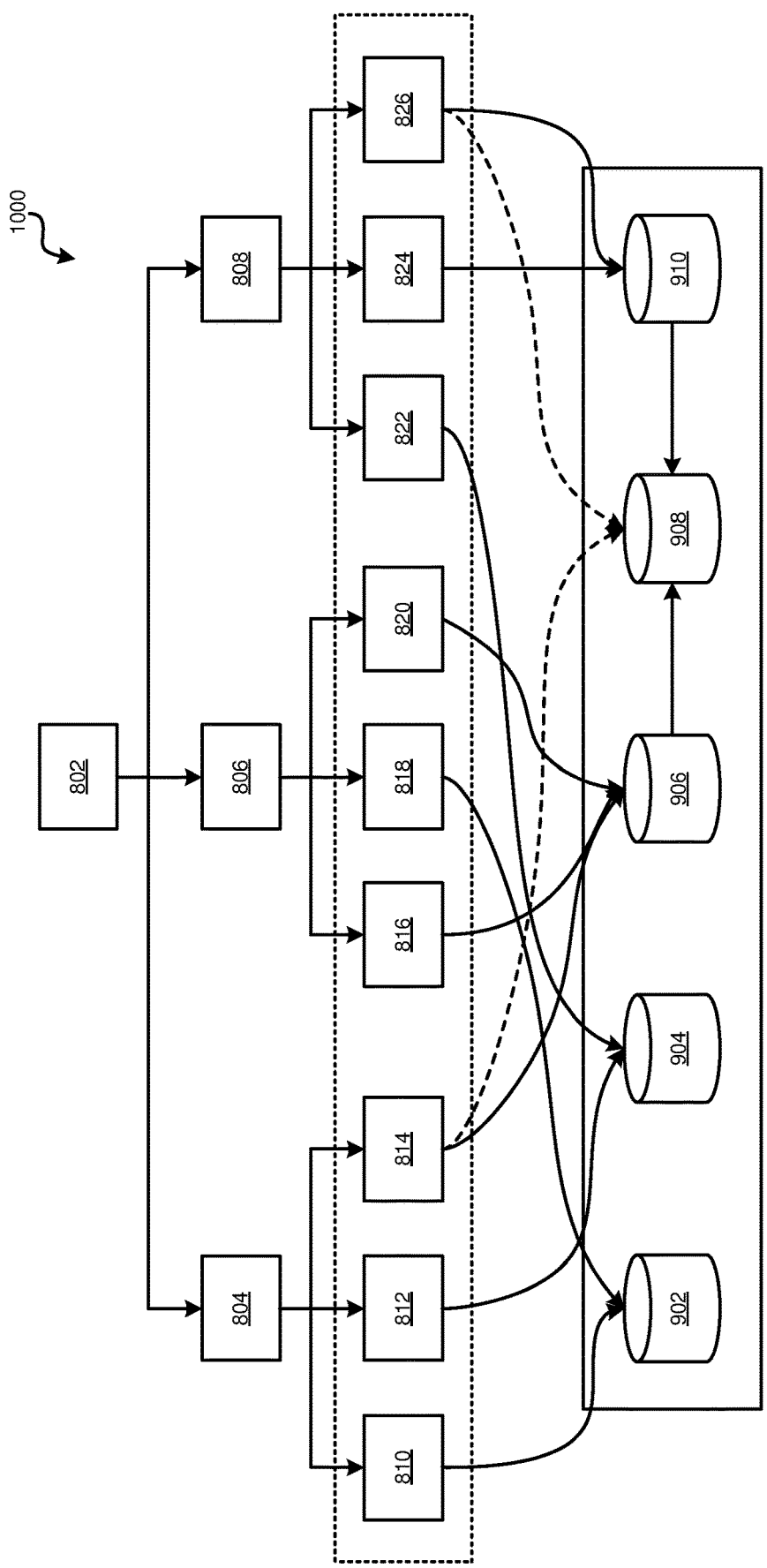
FIG. 10 depicts a block diagram of a final data structure in accordance with an illustrative embodiment.

FIGS. 9 and 10 depict block diagrams illustrating the functioning of a partition manager for deleting (FIG. 9) and adding (FIG. 10) a node in a data structure that has previously been constructed according to disclosed embodiments. In the illustrated embodiment, the repartitioning module 610 of FIG. 6 performs the illustrated database maintenance tasks, such as removing a node (FIG. 9) or adding a node (FIG. 10) and repartitioning the data to be redistributed among the resulting nodes. In some embodiments, the repartitioning module 610 is able to initiate a redistribution procedure performed by other DDBMS modules 512 of FIG. 5, which may be triggered by the removal or addition of a node. In some such embodiments, the repartitioning module 610 triggers such a procedure by changing the weight of a problem node. Since the node identifier (Node_id) is dependent on the weight value, this changes the node identifier of the problem node, which has the effect of simulating a node removal and replacement, thereby triggering redistribution and balancing of the data among the nodes With reference to FIG. 9, this figure depicts a block diagram of a partition tree data structure 900 in accordance with an illustrative embodiment. In a particular embodiment, the partition tree data structure 900 is an example of the partition tree data structure 800 of FIG. 8 in which like element numbers continue to represent like elements described above. In the illustrated embodiment, leaf nodes 810-826 correspond with, and store data indicative of, respective logical partitions that are initially stored on physical nodes 902-910, with the logical nodes for leaf nodes 814 and 826 being initially stored on physical node 908 as indicated by broken-line arrows. However, as indicated by solid-line arrows, physical node 908 is deleted logical nodes for leaf nodes 814 and 826 are thereafter moved to physical nodes 906 and 910, respectively.

With reference to FIG. 10, this figure depicts a block diagram of a partition tree data structure 1000 in accordance with an illustrative embodiment. In a particular embodiment, the partition tree data structure 1000 is an example of the partition tree data structure 800 of FIG. 8 and partition tree data structure 900 of FIG. 9 in which like element numbers continue to represent like elements described above. In the illustrated embodiment, previously-deleted physical node 908 is brought back online (e.g., repaired or replaced). Logical nodes corresponding to leaf nodes 810-826 are initially stored on physical nodes 902-910, with logical nodes of leaf nodes 814 and 826 being initially stored on physical nodes 906 and 910, respectively, as indicated by solid lines. However, as indicated by broken-line arrows, physical node 908 is added, and logical nodes of leaf nodes 814 and 826 are thereafter moved to physical node 908.

Figure 11:
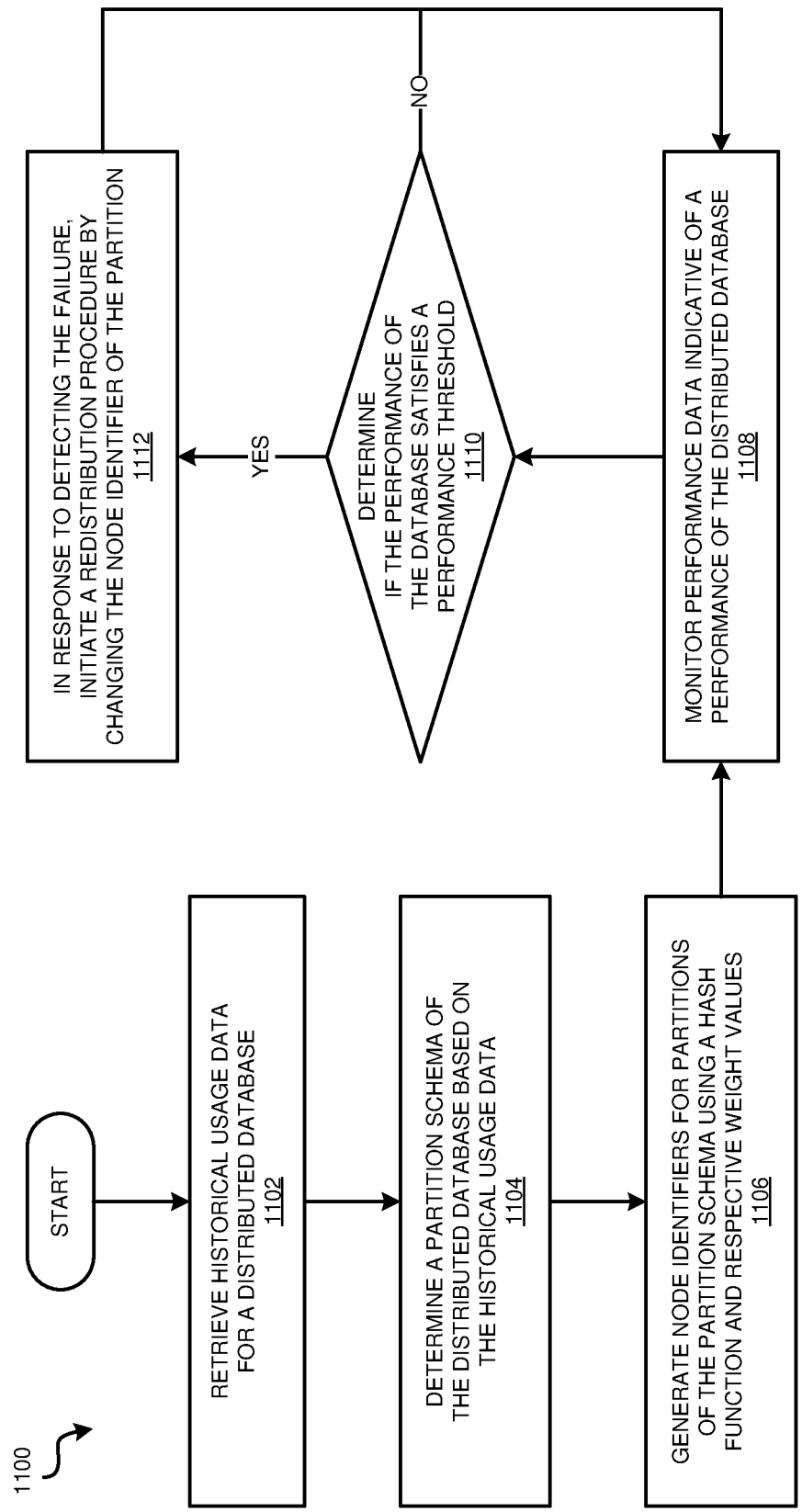
FIG. 11 depicts a flowchart of an example process for automated partitioning of a distributed database system in accordance with an illustrative embodiment.

With reference to FIG. 11, this figure depicts a flowchart of an example process 1100 for automated partitioning of a distributed database system in accordance with an illustrative embodiment. In a particular embodiment, the partition manager 600 carries out the process 1100.

In an embodiment, at block 1102, the process retrieves historical usage data for a DDBS. Next, at block 1104, the process determines a partition schema of the DDBS based on the historical usage data. In some embodiments, the process at block 1104 includes determines partition ranges of one or more partitions of the partition schema. Next, at block 1106, the process generates a node identifier(s) for the one or more new partition(s) using a hash function and respective weight values assigned to the partition(s). Next, at block 1108, the process monitors performance data indicative of a performance of the DDBS. Next, at decision block 1110, the process determines if the performance of the database satisfies a performance threshold. If so, the process returns to block 1108 for continued performance monitoring. However, if the process determines that the performance of the database fails to satisfy a performance threshold, the process continues to block 1112. At block 1112, in response to detecting the failure, the process initiates a redistribution procedure by changing the node identifier of the partition. In some embodiments, the process changes the node identifier of the partition by replacing the first weight value with a second weight value. This change initiates a redistribution routine by the DDBMS. Upon completion, the process returns to block 1108 for continued performance monitoring.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM) or Flash memory, a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   generating a partition schema for a single distributed database based on historical usage data indicative of usage of the single distributed database, wherein the generating of the partition schema comprises determining a partition range of a partition of the partition schema;
   generating a node identifier for the partition using a hash function and a first weight value assigned to the partition;
   monitoring performance data indicative of a performance of the single distributed database, the monitoring comprising detecting a failure of the performance to satisfy a performance threshold; and
   initiating, responsive to detecting the failure, a redistribution procedure by changing the node identifier of the partition by replacing the first weight value with a second weight value.

2. The computer implemented method of claim 1, wherein the generating of the partition schema further comprises determining an access mode.

3. The computer implemented method of claim 1, wherein the historical usage data comprises workload data.

4. The computer implemented method of claim 3, further comprising:
   collecting the workload data over a period of time, the workload data comprising queries to the single distributed database.

5. The computer implemented method of claim 4, wherein the determining of the partition range comprises parsing the workload data by extracting ranges associated with queries represented by the workload data.

6. The computer implemented method of claim 5, wherein the determining of the partition range comprises determining a first access mode for a first partition range and a second access mode for a second partition range.

7. The computer implemented method of claim 6, wherein the determining of the first access mode comprises assigning a random access mode based on the first partition range being determined using hash key range partitioning.

8. The computer implemented method of claim 7, wherein the determining of the second access mode comprises assigning a range access mode based on the second partition range being determined using data key range partitioning.

9. The computer implemented method of claim 8, wherein the first and second partition ranges are part of a same table of the single distributed database.

10. The computer implemented method of claim 1, wherein the hash function is a function of a logical partition key of the partition and a copy number of the partition.

11. A computer program product comprising one or more computer readable storage media, and program instructions collectively stored on the one or more computer readable storage media, the program instructions executable by a processor to cause the processor to perform operations comprising:
    generating a partition schema for a single distributed database based on historical usage data indicative of usage of the single distributed database, wherein the generating of the partition schema comprises determining a partition range of a partition of the partition schema;
    generating a node identifier for the partition using a hash function and a first weight value assigned to the partition;
    monitoring performance data indicative of a performance of the single distributed database, the monitoring comprising detecting a failure of the performance to satisfy a performance threshold; and
    initiating, responsive to detecting the failure, a redistribution procedure by changing the node identifier of the partition by replacing the first weight value with a second weight value.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
    program instructions to meter use of the program instructions associated with the request; and
    program instructions to generate an invoice based on the metered use.

14. The computer program product of claim 11, wherein the generating of the partition schema further comprises determining an access mode.

15. The computer program product of claim 11, wherein the historical usage data comprises workload data.

16. The computer program product of claim 15, further comprising:
collecting the workload data over a period of time, the workload data comprising queries to the single distributed database.

17. The computer program product of claim 16, wherein the determining of the partition range comprises parsing the workload data by extracting ranges associated with queries represented by the workload data.

18. The computer program product of claim 17, wherein the determining of the partition range comprises determining a first access mode for a first partition range and a second access mode for a second partition range.

19. The computer program product of claim 18, wherein the determining of the first access mode comprises assigning a random access mode based on the first partition range being determined using hash key range partitioning.

20. A computer system comprising a processor and one or more computer readable storage media, and program instructions collectively stored on the one or more computer readable storage media, the program instructions executable by the processor to cause the processor to perform operations comprising:
generating a partition schema for a single distributed database based on historical usage data indicative of usage of the single distributed database, wherein the generating of the partition schema comprises determining a partition range of a partition of the partition schema;
generating a node identifier for the partition using a hash function and a first weight value assigned to the partition;
monitoring performance data indicative of a performance of the single distributed database, the monitoring comprising detecting a failure of the performance to satisfy a performance threshold; and
initiating, responsive to detecting the failure, a redistribution procedure by changing the node identifier of the partition by replacing the first weight value with a second weight value.

* * * * *